Patented June 12, 1945

2,378,141

UNITED STATES PATENT OFFICE 2,378,141

METHOD FOR RECOVERING QUEBRACHITOL FROM RUBBER LATEX SERUM

William J. Hart, Warren Point, N. J., assignor to United States Rubber Company, New York, N. Y., a corporation of New Jersey No Drawing. Application August 11, 1943, Serial No. 498,156

8 Claims. (Cl. 260—611)

This invention relates to an improved method of recovering quebrachitol from rubber latex serum.

Quebrachitol (1-methylinositol) is present in rubber latex to the extent of about 1 to 2% of the serum content. Rhodes and Wiltshire, R. R. I. of Malaya, vol. 3 page 160, (1932) describe the extraction of quebrachitol from latex serum after coagulation of the rubber by evaporating the rubber-free serum to a very small percentage of the original volume, removing coagulum and evaporating the residual liquor. The crystallization of the quebrachitol is very difficultly accomplished by this method and low yields result. The process of the present invention permits the ready extraction of quebrachitol from rubber latex serum in nearly theoretical yields and with high purity.

In carrying out the present invention, various materials in the rubber latex serum which interfere with the crystallization of the quebrachitol are removed, after which the treated serum may be readily evaporated with easy crystallization of the quebrachitol from the purified serum. To the rubber latex serum, which may be the serum resultant from the conventional acid coagulation of the rubber of the latex, or which may be remaining from a creaming or centrifuging operation, is added lime, in the form of calcium oxide or calcium hydroxide or solutions thereof, and the serum is heated, preferably to boiling, whereby proteinous material and any rubber remaining in the serum are coagulated. The thus treated serum is filtered and, if desired, ammonia used in the preservation of the latex may be here recovered on partial evaporation. The excess lime is then precipitated as by passing carbon dioxide gas through the serum, or by the addition of phosphoric acid. It is preferred to precipitate the excess lime by passing carbon dioxide into the serum until the pH is below 8, after which the precipitated calcium salt is filtered, leaving a serum containing essentially the quebrachitol together with relatively large amounts of the monovalent metal ions, sodium potassium, and rubidium, and nitrogenous material, such as amino acids and polypeptides. The pH of the serum is then reduced, preferably with a volatile non-oxidizing acid, such as acetic, formic or hydrochloric acid, to below 5, and preferably within the range of 3 to 4. The thus acidified serum is then passed through a cation exchange material which removes monovalent metal ions and more or less of the nitrogenous material and exchanges them for hydrogen ion. Cation exchange materials are well known and described in the following patents: Adams & Holmes 2,104,501; Findley 2,230,641; Wilson 2,235,971; Wassenegger et al. 2,204,539 and 2,259,503. Other cation exchange materials are sulphonated coal, sulphonated humus and the like. In removing polyvalent metal ions and some of the nitrogenous material by the use of these cation exchange materials, the conventional hydrogen exchange cycle should be employed. This consists in running a dilute solution, say 1 to 6% concentration, of a strong acid through the cation exchange material until it is regenerated to the acid form, washing the cation exchange bed acid-free, passing the serum through the bed until it has removed sufficient of the monovalent metal ions and nitrogenous material, and then repeating the acid regeneration cycle. Ninety per cent or more of the ash, mostly sodium, potassium and rubidium salts, which remains after the lime and carbon dioxide treatment, may readily be removed by such a cationic exchange material together with possibly 70% of the nitrogenous material. With some latex sera, however, it is difficult to reduce to this extent the nitrogenous materials, and in such cases the serum after treatment with the cation exchange resin may be treated with an anion exchange material to remove further introgenous material. The anion exchange material acts similarly to the cation exchange material as above described, except that the anion exchange material operates on the hydroxide cycle, so that an alkaline material such as a solution of sodium carbonate or sodium hydroxide is used in the regenerating cycle instead of an acid solution. Such anion exchange materials are disclosed in the following patents: Adams & Holmes 2,151,883; Kirkpatrick 2,106,486; Little 2,259,169; and Briessbach et al. 2,228,514.

It is noted that the serum to be treated with either cation or anion exchange material has a pH below 5 and preferably between 3 and 4. The nitrogenous materials which are removed are chiefly in the form of amino acids or polypeptides. The cation exchange material operates on the $RNH_3^+$ group in such compounds, while the anion exchange material absorbs materials of the RCOOH type, both of these groups representing the acid form of the nitrogenous compounds which are removable at these low pH's. The latex serum, after treatment with the cation exchange material or after treatment with the cation exchange material followed by treatment with the anion exchange material, may then be evaporated, preferably under reduced pressure, whereupon the quebrachitol readily crystallizes out in the form of white crystals. Yields of 1½% to 2% by weight of quebrachitol are readily obtained from the serum resulting from the coagulation or from a single creaming or centrifuging of Hevea latex.

The following is an example of obtaining quebrachitol by the present invention from the serum of a second purifying operation containing a relatively small percentage of quebrachitol:

To 3 litres of the second serum from a latex which had been centrifuged and then creamed was added 15 grams of Ca(OH)$_2$. This serum contained only 0.6% quebrachitol and 2.7% total solids. The serum was heated to boiling, whereupon a light brown slurry was obtained which filtered easily. The remaining light red colored liquor was evaporated to 50% of its original volume, ammonia being eliminated, and the residual calcium was precipitated by bubbling carbon dioxide through the serum until the pH was reduced to 7. The calcium carbonate precipitate was filtered off. The serum was acidified with 70 cc. of 4% HCl to a pH of about 3.84, and divided into 5 portions. Each portion was passed once through a 350 ml. cation exchange bed. There were 150 ml. of 4% HCl used in the regenerating step after the passage of each successive portion through the exchanger. On evaporation under reduced pressure (15 cm. of mercury) 15.5 grams of crude quebrachitol crystals (95% recovery) were obtained.

In view of the many changes and modifications that may be made without departing from the principles underlying the invention, reference should be made to the appended claims for an understanding of the scope of the protection afforded by the invention.

Having thus described my invention, what I claim and desire to protect by Letters Patent is:

1. A method for obtaining quebrachitol from rubber latex serum which comprises removing from the serum constituents which are precipitated by lime at elevated temperature, removing excess lime and adjusting the pH to below 5, removing monovalent metal ions and nitrogenous material from the thus treated serum at a pH below 5 by treatment with a cation exchange material, evaporating the thus treated serum and crystallizing out the quebrachitol.

2. A method for obtaining quebrachitol from rubber latex serum which comprises removing from the serum constituents which are precipitated by lime at elevated temperature, removing excess lime and adjusting the pH to below 5, removing monovalent metal ions and nitrogenous material from the thus treated serum at a pH below 5 by treatment with a cation exchange material, removing further nitrogenous material by treatment with an anion exchange material, evaporating the thus treated serum and crystallizing out the quebrachitol.

3. A method for obtaining quebrachitol from rubber latex serum which is free of serum constituents precipitable by lime at elevated temperature and free of excess lime, which comprises adjusting the pH to below 5, removing monovalent metal ions and nitrogenous material from the thus treated serum at a pH below 5 by treatment with a cation exchange material, evaporating the thus treated serum and crystallizing out the quebrachitol.

4. A method for obtaining quebrachitol from rubber latex serum which is free of serum constituents precipitable by lime at elevated temperature, and free of excess lime, which comprises adjusting the pH to below 5, removing monovalent metal ions and nitrogenous material from the thus treated serum at a pH below 5 by treatment with a cation exchange material, removing further nitrogenous material by treatment with an anion exchange material, evaporating the thus treated serum and crystallizing out the quebrachitol.

5. A method for obtaining quebrachitol from rubber latex serum which comprises adding lime to said serum and heating to boiling, filtering, passing carbondioxide into the thus treated serum, filtering, reducing the pH to below 5, passing the thus treated serum at a pH below 5 through a cation exchange material to remove monovalent metal ions and nitrogenous material, and evaporating and crystallizing out the quebrachitol.

6. A method for obtaining quebrachitol from rubber latex serum which comprises adding lime to said serum and heating to boiling, filtering, passing carbondioxide into the thus treated serum until the pH is below 8, filtering, reducing the pH to below 5, passing the thus treated serum at a pH below 5 through a cation exchange material to remove monovalent metal ions and nitrogenous material, and evaporating and crystallizing out the quebrachitol.

7. A method for obtaining quebrachitol from rubber latex serum which comprises adding lime to said serum and heating to boiling, filtering, passing carbondioxide into the thus treated serum, filtering, reducing the pH to below 5, passing the thus treated serum at a pH below 5 through a cation exchange material to remove monovalent metal ions and nitrogenous material, passing the serum through an anion exchange material to remove further nitrogenous material, and evaporating and crystallizing out the quebrachitol.

8. A method for obtaining quebrachitol from rubber latex serum which comprises adding lime to said serum and heating to boiling, filtering, passing carbondioxide into the thus treated serum until the pH is below 8, filtering, reducing the pH to below 5, passing the thus treated serum at a pH below 5 through a cation exchange material to remove monovalent metal ions and nitrogenous material, passing the serum through an anion exchange material to remove further nitrogenous material, and evaporating and crystallizing out the quebrachitol.

WILLIAM J. HART.